United States Patent
Teurlinx et al.

(10) Patent No.: US 11,690,382 B2
(45) Date of Patent: Jul. 4, 2023

(54) SHACKLE FOR PROCESSING HANGING POULTRY AND METHOD FOR ATTACHING SUCH A SHACKLE

(71) Applicant: Marel Poultry B.V., Av Boxmeer (NL)

(72) Inventors: Engelbertus Johannes Jacobus Teurlinx, At Stevensbeek (NL); Franciscus Arnoldus Albertus Van Berkel, Lz Helmond (NL); Rene Johannes Theodorus Janssen, Hj Nijmegen (NL); Richard Jozef De Schutter, Al Steenbergen (NL); Tim Petrus Wilhelmus Jaspers, Bb Haps (NL)

(73) Assignee: Marel Poultry B.V., Av Boxmeer (NL)

(*) Notice: Subject to any disclaimer, the term of this patent is extended or adjusted under 35 U.S.C. 154(b) by 191 days.

(21) Appl. No.: 17/414,241

(22) PCT Filed: Dec. 12, 2019

(86) PCT No.: PCT/NL2019/050828
§ 371 (c)(1),
(2) Date: Jun. 15, 2021

(87) PCT Pub. No.: WO2020/139081
PCT Pub. Date: Jul. 2, 2020

(65) Prior Publication Data
US 2022/0046934 A1   Feb. 17, 2022

(30) Foreign Application Priority Data
Dec. 24, 2018 (NL) .................................. 2022308

(51) Int. Cl.
*A22C 21/00* (2006.01)

(52) U.S. Cl.
CPC ...... *A22C 21/0007* (2013.01); *A22C 21/0053* (2013.01)

(58) Field of Classification Search
CPC .................. A22C 21/0007; A22C 21/0053
(Continued)

(56) References Cited

U.S. PATENT DOCUMENTS

| 2,438,608 A | 3/1948 | Johnson |
| 3,166,785 A * | 1/1965 | Lemmond .......... A22C 21/0007 198/465.4 |

(Continued)

FOREIGN PATENT DOCUMENTS

EP   0512636 A1   11/1992

OTHER PUBLICATIONS

International Search Report and Written Opinion issued in corresponding International Patent Application No. PCT/NL2019/050828, dated Mar. 12, 2020 (12 pages).

(Continued)

*Primary Examiner* — Richard T Price, Jr.
(74) *Attorney, Agent, or Firm* — Osha Bergman Watanabe & Burton LLP

(57) ABSTRACT

The present invention relates to a shackle for processing hanging poultry comprising a poultry catching element; a suspension rod; and a fastening hook; wherein one side of the suspension rod is pivotably connected with a pivotable connection with the fastening hook and the opposite side of the suspension rod is moveably coupled with the poultry catching element by a moveable coupling. The invention also provides a method for attaching a shackle for processing hanging poultry on an overhead conveyor.

16 Claims, 3 Drawing Sheets

Figure 1:
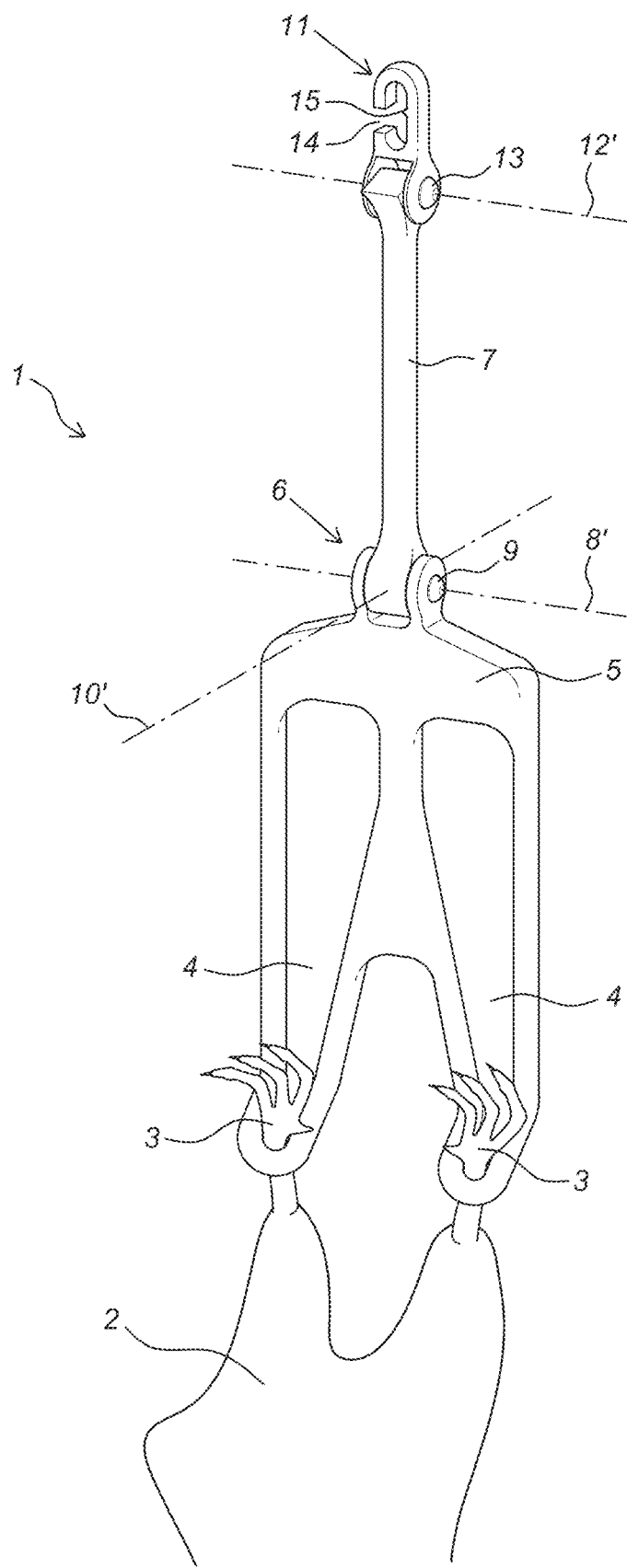

(58) Field of Classification Search
USPC .......................................................... 452/188
See application file for complete search history.

(56) References Cited

U.S. PATENT DOCUMENTS

| | | | |
|---|---|---|---|
| 3,656,206 A | | 4/1972 | Klevgard |
| 3,686,712 A | * | 8/1972 | Lewis ................ A22C 21/0007 452/179 |
| 5,037,351 A | * | 8/1991 | Van Den Nieuwelaar ................. A22C 21/00 452/179 |
| 6,264,544 B1 | * | 7/2001 | Mullins .................... A22B 5/06 452/191 |
| 7,226,351 B1 | * | 6/2007 | Sliger .................... A22B 7/002 452/188 |
| 2010/0304653 A1 | * | 12/2010 | Criscione, II ...... A22C 21/0007 452/187 |
| 2015/0004894 A1 | | 1/2015 | Criscione, II et al. |

OTHER PUBLICATIONS

Search Report and Written Opinion issued in corresponding Netherlands Patent Application No. NL2022308, dated Sep. 10, 2019 (11 pages).

* cited by examiner

SHACKLE FOR PROCESSING HANGING POULTRY AND METHOD FOR ATTACHING SUCH A SHACKLE

The invention relates to a shackle for processing hanging poultry comprising a poultry catching element, a suspension rod and a fastening hook. The invention also relates to a method for attaching such a shackle on an overhead conveyor.

During the automated processing of poultry various types of operations are performed on the carcasses. Normally the poultry is hung with their legs attached in shackles or brackets to transport the poultry along a predetermined transport path. Such transport path is usually dictated by an overhead conveyor. Various types of shackle structures and conveyor types for such poultry transportation are known. During transportation of the poultry hanging on the shackles various types of processes may be performed on the poultry carcasses. For instance after stunning the poultry the stunned animals are attached to shackles by securing the legs in dedicated tapered shackle apertures. As a result the poultry are hanging with their heads downwards and the legs attached in the shackles to be moved along a poultry processing path. Normally the poultry is first hung in shackles in a slaughtering line after which they are plucked and then transferred to a subsequent poultry processing line for instance for at least partial evisceration of the carcasses. A next step is to cool the carcasses to lower temperatures after which cooling subsequent processing steps are performed on the carcasses or remaining carcass parts (as carcasses parts may be removed during the processing). During all these carcass processing steps on industrial scale transporting of the poultry carcasses takes place, often for a relative long time period (especially the cooling) and thus numerous shackles (in the order of several thousand shackles per line) may be attached to only a single overhead conveyor used in an industrial scale poultry processing plant while there may also be several parallel and/or subsequent transporting lines carrying shackles may be used in a single processing plant. As a result it may be clear that "standardised" shackles for processing hanging poultry are used in large numbers in the poultry processing industry.

A problem with the shackles for processing hanging poultry according the prior art is that the shackles sometimes get positioned in undesired positions. Examples of such undesired shackle positions are the interference (entanglement) of adjoining shackles, interference of shackles with processing equipment along the transport path of the shackles and shackles being stuck in non-vertical (non-hanging) orientation like a more or less horizontal orientation. A further problem of the prior art shackles is the difficulty of disconnecting from and attaching to an overhead conveyor of shackles.

It is therefore an object of the present invention to provide an improved shackle for processing hanging poultry and a method for attaching such a shackle which overcome the abovementioned drawbacks.

The invention thereto provides a shackle for processing hanging poultry according to claim 1. The pivotable connection of the fastening hook and the suspension rod—which in the hanging position of the shackle is on the upper side of the suspension rod—and the parallel pivotable connection of the suspension rod and poultry catching element around a first hinge axis—which in the hanging position of the shackle is on the lower side of the suspension rod—enable the poultry catching element to be moved side-wards relative to the overhead conveyor and thus enables to move the poultry towards for instance towards processing equipment. The additional freedom of movement provided by the coupling of the suspension rod and poultry catching element (the second degree of freedom; pivotation (hinging) around the second hinge axis perpendicular to the first hinge axis and the longitudinal direction of the suspension rod) makes the positioning of the poultry catching element more "forgiving", yet all within clear limitations. This combination of required freedom of movement to enable easy and smooth processing of the poultry with also a substantial limitation in the freedom of movement within the shackles prevents the shackle to be oriented such that the shackles according the present invention get positioned in undesired positions, get entanglement with adjoining shackles, undesired interfere with processing equipment and/or get stuck in non-vertical (non-hanging) orientation.

In an embodiment the fastening hook is an open hook, which allows the shackle according the present invention to be coupled and/or uncoupled from an overhead conveyor system easily and without the necessity of tools. Although the hook is open the coupling with the overhead conveyor may still be reliable if and when the open side of the hook is turned away from the transport direction of the overhead conveyor. When the inside of the hook of the fastening hook is also provided with a retaining protrusion, this may further enhance the reliability of the coupling of the shackle with an overhead conveyor as the retaining protrusion may act as a "threshold" or safeguard that prevents (or at least limits the chance) of undesired loosening of a shackle. The retaining protrusion will thus act as an additional security. The retaining protrusion may also provide a "tactile feedback" for the operator coupling a shackle according the present invention with an overhead conveyor as the passage of the retaining protrusion of a shackle carrying element of the overhead conveyor may provide a sensible feed-back that ensures the operator that the hackle is brought in a correct coupled position. Furthermore the retaining protrusion may further prevent that the shackle will end up in a substantial horizontal equilibrium position (instead of ending up a "normal" hanging down position) as such substantial horizontal shackle position is undesired and may hinder the poultry processing, operators or processing equipment and may even lead to product losses and/or damage on shackles or equipment. To prevent such "balancing" non-vertical shackle positions the location of the retaining protrusion is preferably located there where the centre of gravity of the shackle is located in an empty shackle situation.

In a further embodiment of the present invention the pivotable connection of the suspension rod with the fastening hook comprises a least one abutment limiting the pivotation to a maximum pivoted position, but this pivotable connection may also comprise two abutments limiting the pivotation between two maximum pivoted positions. The limitation in pivotable freedom of movement prevents the shackle to swing to far outwards and may thus be useful to prevent the shackle to interfere with for instance processing equipment along the transport path of the shackles or product guides. This limitation in the movement may also prevent any operators along the transport path of the shackles to be hindered by too far outward swinging shackles. To enable the shackles to resist the movement limiting loads on parts of the shackle by distribution of the pressures exerted the shackle may be provided with cooperating contact surfaces on suspension rod and the fastening hook, preferably cooperating flat surfaces. In practise good results may be realised when the pivotable connection of the suspension rod with the fastening hook is pivotable over maximum 120°, maximum 100° or maximum 90°. In a simple construction the pivotable connection of the suspension rod with the fastening hook comprises a connecting shaft.

In a further embodiment the moveable coupling of the suspension rod and the poultry catching element comprises: a coupling fork with two opposite apertures, the coupling fork being part of the poultry catching element; a coupling shaft; and a passage in the coupling rod, which coupling shaft transpierces the two apertures in the coupling fork and the passage in the coupling rod that is located between the two apertures in the coupling fork. The coupling fork has two opposing legs, both having an opening to hold a coupling shaft. The set apart openings in the legs are preferably co-axially aligned so that the coupling shaft may easy be fixed in the aperture while also being inserted in the passage in the coupling rod.

The passage in the coupling rod may be widening to the sides, for instance by providing a passage in the coupling rod with an inner surface of the passage being convex (with the result that the passage is concave). As the passage widens to the sides this provides the additional freedom of movement to enable the poultry catching element to pivot around the second hinge axis (that is thus perpendicular to the first hinge axis and the longitudinal direction of the suspension rod). As an alternative for (or in combination with) the widening passage in the coupling rod the coupling shaft there where contacting the passage in the coupling rod is convex. The pivotable connection of the suspension rod and the poultry catching element around the second hinge axis may be pivotable over only a limited angle, for instance an angle of maximum 20°, maximum 15° or maximum 10°.

The poultry catching element, the suspension rod and/or the fastening hook may be made from a fibre-reinforced Polyamide, for instance a glass-fibre-reinforced impact-modified Polyamide. As the shackle according the present invention is to be used in the food industry it is important that is fulfils all requirements for such application. Furthermore the chance of material particles loosening from the shackle has to be limited, the shackle has to be form-retaining, is preferably light in weight and easy to produce. A fibre-reinforced Polyamide, like a glass-fibre-reinforced impact-modified Polyamide, fulfils all these requirement. However as an alternative the shackle, or part of the shackle, may also be made from a metal. As the connecting shaft connecting the poultry catching element and the suspension rod and/or connecting the suspension rod and the fastening hook is used differently (with different typical loads) these connecting shafts may be preferably be made from another plastic, for instance POM.

The present invention also provides a method for attaching a shackle for processing hanging poultry according the present invention with an open fastening hook on an overhead conveyor according claim 15. Due to the open hook of the fastening hook being attached to a hook holder on the overhead conveyor such that the closed side of the fastening hook is located ahead the open side of the fastening hook when seen in the transport direction of the overhead conveyor, the shackle will be solidly coupled with the overhead conveyor with hardly any chance of undesired uncoupling. The advantage of the open hook construction (easy coupling and uncoupling without the need of tools as already mentioned earlier in relation to the shackle according the present invention) are thus combined with the desired solidity of the coupling of the shackle and the overhead conveyor during use. To provide the operator feed-back on the correct coupling of the shackle and the overhead conveyor a retaining protrusion on the inside of the hook of the fastening hook with resistance is moved over the hook holder. The retaining protrusion furthermore also provided an additional safeguard against undesired uncoupling. The open side of the hook may thus be related to the direction of movement of the hook (on the side turned away from the forward transport hook side). Dependent on the type of transport and processing system used the location of the open side is thus determined. However also hooks with two open hook versions ("left and right shackles") dual hooks may be used in combination, for instance when shackles are split up with a line-divider in two (or more) rows to still enable veterinary inspection even when (very) high line speeds are applied. All technical features of each of the embodiments of the shackle according the present invention as described above may be combined randomly with one or more of the other embodiments of the shackle according the present invention as described above.

Figure 2:
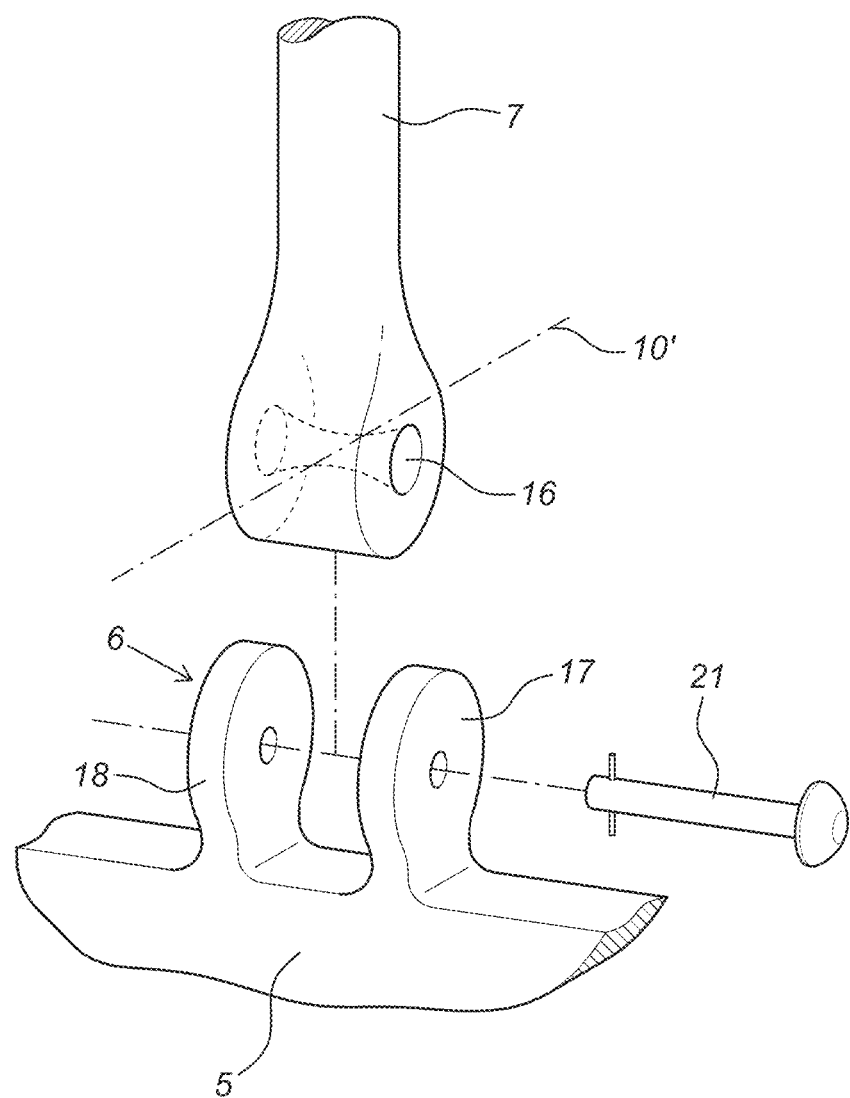
Figure 3:
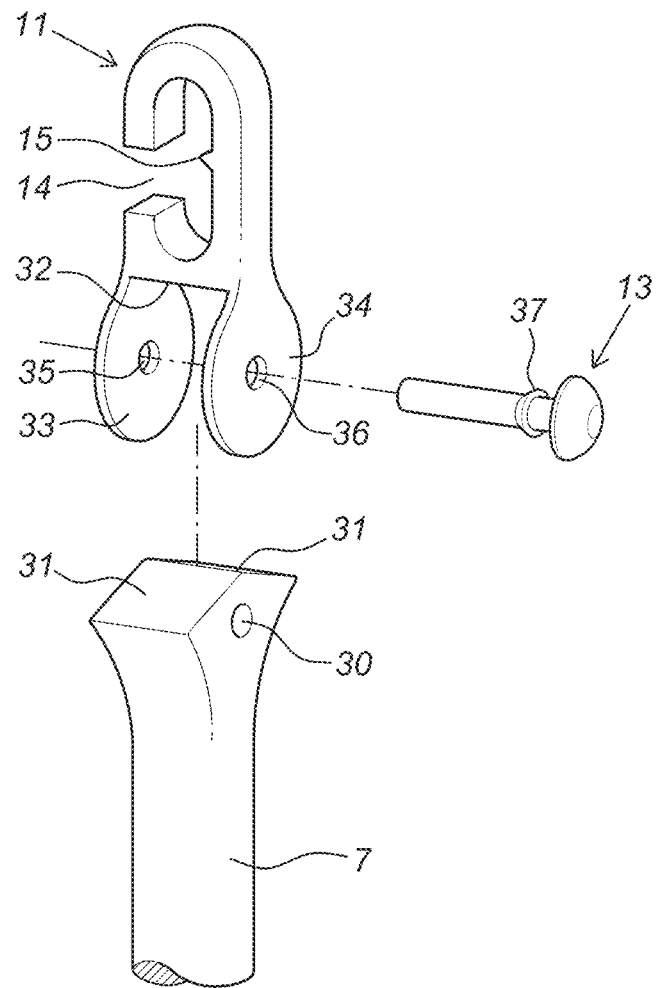

The invention will be further elucidated herein below on the basis of the non-limitative exemplary embodiments shown in the following figures. Herein:

FIG. 1 a perspective view on a shackle according to the invention for processing hanging poultry;

FIG. 2 a detailed exploded view on the moveable coupling of the poultry catching element and the suspension rod being part of the shackle according to FIG. 1; and FIG. 3 a detailed exploded view on the pivotable coupling of the suspension rod and the fastening hook being part of the shackle according to FIG. 1.

FIG. 1 shows a perspective view on a shackle 1 wherein a chicken 2 is attached in a hanging position with the legs 3 of the chicken 2 clamped in tapering slots 4 of a poultry catching element 5. The poultry catching element 5 is in the industry also referred to as bracket. The poultry catching element 5 is also provided with a fork-shaped coupling element 6 that is moveable connected to a suspension rod 7. The moveable connection of the poultry catching element 5 and the suspension rod 7 has a first hinge axis 8' (that is embodied by a shaft 9) and a second hinge axis 10' that is perpendicular to the first hinge axis 8 and the longitudinal direction of the suspension rod 7. The physical realisation of the second hinge axis 10' will be further clarified in relation to FIG. 2.

On the side of the suspension rod 7 opposite the side where the suspension rod 7 is moveable coupled with the catching element 5 the suspension rod 7 is pivotable connected with a fastening hook 11. The fastening hook 11 and the suspension rod hinge around third axis 12' which is embodied by a shaft 13. The third axis 12' is parallel to the first hinge axis 8' connecting the poultry catching element 5 and the suspension rod 7 thus allowing the poultry catching element 5 to move side wards compared to the fastening hook 11.

The fastening hook 11 has an opening 14 that allows easy coupling and uncoupling of the fastening hook 11 to a carrying structure (e.g. and overhead conveyor, not shown in this figure). On the inside of the carrying hook 11 a retaining protrusion 15 is provided to enhance the reliability of the coupling and as explained above.

FIG. 2 shows a detailed exploded view on the moveable coupling of the poultry catching element 5 and the suspension rod 7 being part of a shackle 1 as shown in FIG. 1. In the suspension rod 5 an aperture 16 (passage) is provided that widens to the sides (as depicted the passage is concave). From the—partial represented—poultry catching element 5 the fork-shaped coupling element 6 protrudes with two legs 17, 18 wherein aligned openings 19, 20 are provided. By inserting a pen 21 (or shaft) though the aligned openings 19, 20 and the passage 16 (while the passage 16 is located in between the openings 19, 20) the catching element 5 and the suspension rod 7 are coupled. The freedom of movement exists of a rotational freedom around the shaft 21 but additionally also the aperture 16 in the suspension rod 7 may be rotated (over a limited angle) over shaft 21 in a sideward direction along a second hinge axis 10' (see also FIG. 1), at least in case there is some spare room between the legs 17, 18 and the suspension rod 5.

FIG. 3 shows a detailed exploded view on the pivotable connection of the suspension rod 7 with the fastening hook 11. The (upper) end of the suspension rod 7 is provided with an opening 30 and also has two abutment surfaces 31 that may limited the maximum positions of pivotation of the suspension rod 7 with the fastening hook 11. In the fastening hook are cooperating abutment surfaces provided, of which only one counter-abutment surface 32 is visible in FIG. 3. The fastening hook 11 is provided with two ears 33, 34, both having an opening 35, 36. The suspension rod 7 and the fastening hook 11 are to be coupled by feeding shaft 13 (pen) through the opening 35, 36 of the fastening hook 11 and the opening 30 that is positioned between the ears 33, 34. For a simple coupling the pen 13 is provided with a protruding rim 37 that enables the pen 13 to snap-fit to an ear 34, 35 of the fastening hook 11 and thus makes a further fastening element superfluous.

The invention claimed is:

1. A shackle for processing hanging poultry, comprising:
    a poultry catching element;
    a suspension rod; and
    a fastening hook,
    wherein one side of the suspension rod is pivotably connected with the fastening hook via a pivotable connection and an opposite side of the suspension rod is moveably coupled with the poultry catching element by a moveable coupling,
    wherein the moveable coupling of the suspension rod and the poultry catching element is pivotable both parallel to a first hinge axis of the pivotable connection of the suspension rod and fastening hook, and around a second hinge axis,
    wherein the second hinge axis is perpendicular to both the first hinge axis and the longitudinal direction of the suspension rod.

2. The shackle for hanging poultry processing according to claim 1, wherein the fastening hook is an open hook.

3. The shackle for hanging poultry processing according to claim 2, wherein the inside of the hook of the fastening hook is provided with a retaining protrusion.

4. A method for attaching a shackle for processing hanging poultry as claimed in claim 2 on an overhead conveyor, the method comprising:
    attaching the open hook of the fastening hook to a hook holder on the overhead conveyor such that the closed side of the fastening hook is located ahead the open side of the fastening hook when seen in the transport direction of the overhead conveyor.

5. The method for attaching a shackle for processing hanging poultry according to claim 4, further comprising: moving a retaining protrusion on the inside of the hook of the fastening hook with resistance over the hook holder.

6. The shackle for processing hanging poultry according to claim 1, wherein the pivotable connection of the suspension rod with the fastening hook comprises a least one abutment limiting the pivotation to a maximum pivoted position.

7. The shackle for processing hanging poultry according to claim 1, wherein the pivotable connection of the suspension rod with the fastening hook comprises two abutments limiting the pivotation between two maximum pivoted positions.

8. The shackle for processing hanging poultry according to claim 1, wherein the pivotable connection of the suspension rod with the fastening hook is pivotable over maximum 120°, maximum 100° or maximum 90°.

9. The shackle for processing hanging poultry according to claim 1, wherein the pivotable connection of the suspension rod with the fastening hook comprises a connecting shaft.

10. The shackle for processing hanging poultry according to claim 1, wherein the moveable coupling of the suspension rod and the poultry catching element comprises:
    a coupling fork with two opposite apertures, the coupling fork being part of the poultry catching element; a coupling shaft; and
    a passage in the coupling rod, which coupling shaft transpierces the two apertures in the coupling fork and the passage in the coupling rod that is located between the two apertures in the coupling fork.

11. The shackle for processing hanging poultry according to claim 9, wherein the passage in the coupling rod is widening to the sides.

12. The shackle for processing hanging poultry according to claim 9, wherein the coupling shaft there where contacting the passage in the coupling rod is convex.

13. The shackle for processing hanging poultry according to claim 1, wherein the pivotable connection of the suspension rod and the poultry catching element around the second hinge axis is pivotable over maximum 20°, maximum 15° or maximum 10°.

14. The shackle for processing hanging poultry according to claim 1, wherein the poultry catching element, the suspension rod and/or the fastening hook is made from a fibre-reinforced Polyamide, for instance a glass-fibre-reinforced impact-modified Polyamide.

15. The shackle for processing hanging poultry according to claim 1, wherein a connecting shaft connecting the poultry catching element and the suspension rod and/or connecting the suspension rod and the fastening hook is made from plastic, for instance POM.

16. The shackle for hanging poultry according to claim 1, wherein the poultry catching element, the suspension rod and/or the fastening hook is made from a metal.

\* \* \* \* \*